Oct. 16, 1951  K. F. KURZ  2,571,584
STEREOSCOPIC TRANSPARENCY HOLDER
Filed April 24, 1948  2 SHEETS—SHEET 1

INVENTOR.
Karl F. Kurz
BY Burnham and Cheatham
Attorney

Oct. 16, 1951        K. F. KURZ        2,571,584
STEREOSCOPIC TRANSPARENCY HOLDER
Filed April 24, 1948        2 SHEETS—SHEET 2
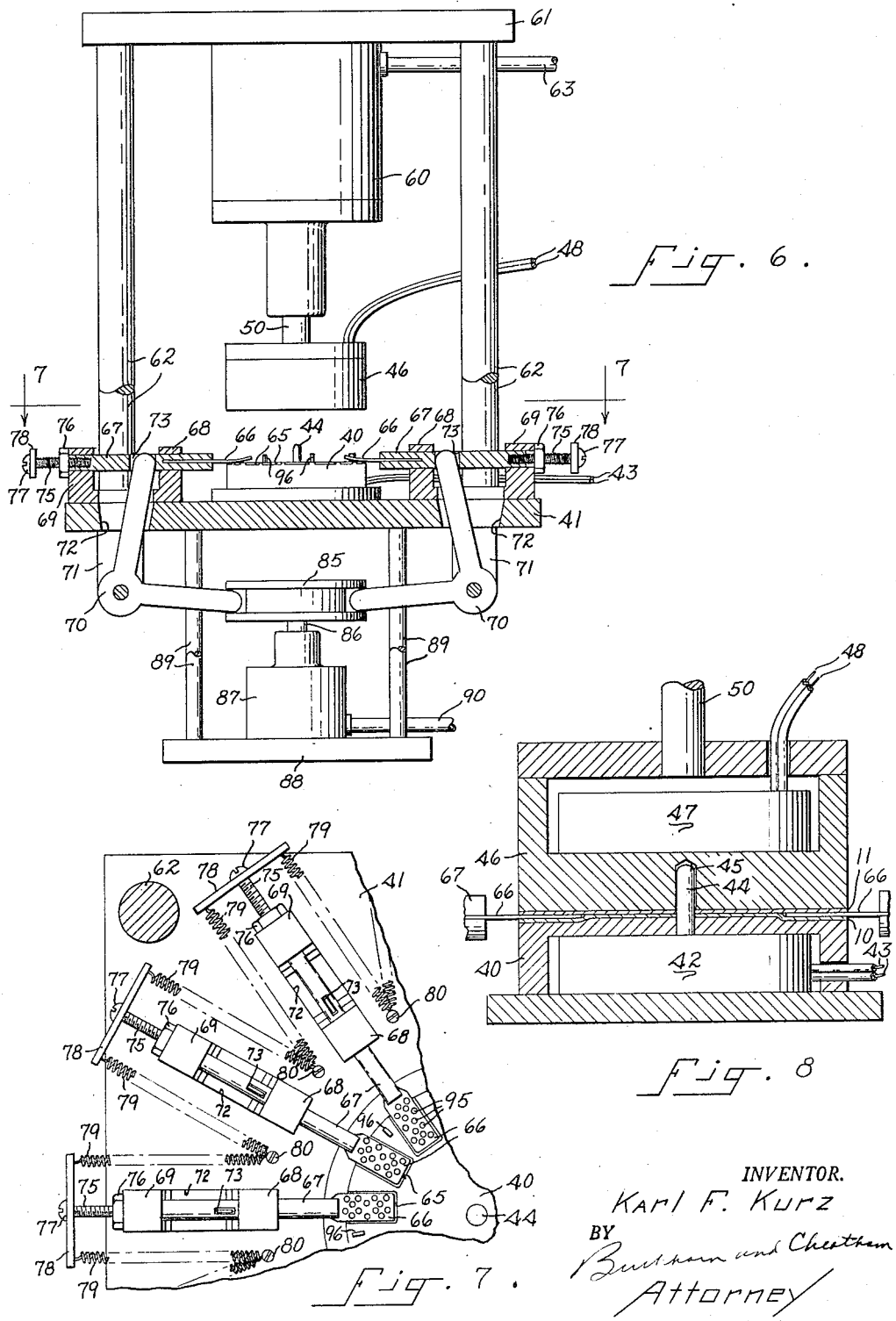
INVENTOR.
Karl F. Kurz
BY
Burnham and Cheatham
Attorney Patented Oct. 16, 1951

2,571,584

UNITED STATES PATENT OFFICE 2,571,584

STEREOSCOPIC TRANSPARENCY HOLDER

Karl F. Kurz, Portland, Oreg., assignor to Stereocraft Engineering Co., Portland, Oreg., a partnership Application April 24, 1948, Serial No. 23,113

5 Claims. (Cl. 40—70)

My present invention relates to a stereoscopic transparency holder and to a method and machine for constructing the same.

The principal object of the present invention is to provide a transparency holder of the general type disclosed and claimed in United States Letters Patent No. 2,189,285, issued September 6, 1940, to Wilhelm B. Gruber and entitled "Stereoscopic Viewing Device," but which is so constructed and arranged that an amateur photographer may mount his own stereoscopic views in a prepared holder, rather than be forced to rely upon the purchase of commercially prepared holders displaying views in which he has no personal interest.

The principal object of the present invention is to provide a holder for stereoscopic transparencies having the general characteristics of the holder described in said patent, but in which transparencies may be arranged selectively in peripheral pockets in the holder and may be maintained therein in exact registry with radially spaced apertures formed in the holder through which the transparencies may be viewed, particularly through the medium of a viewer such as disclosed and claimed in the aforementioned patent.

A further object of the present invention is to provide a transparency holder of the type described in which radially disposed transparency receiving pockets are arranged in exact registry with each other in opposed pairs, and in which transparencies may be removably mounted in proper relation to each other for stereoscopic viewing.

A further object of the present invention is to provide a holder for stereoscopic transparencies comprising a pair of substantially coextensive blanks united face-to-face to form a single disc, at least one of said blanks having embossments raised from the adjacent surface of the other blank to define rectangular pockets opening at the periphery of the disc.

A further object of the present invention is to provide a transparency holder comprising means for removably receiving pairs of transparencies, which is so constructed and arranged as to maintain the transparencies in a common plane and in exact stereoscopic registry with each other.

A further object of the present invention is to provide a method and means for forming transparency holders of the foregoing type.

Referring to the drawings,

Fig. 6 is a side elevation, partially in section, of a machine capable of forming the present invention;

Fig. 7 is a horizontal section of a segment of the machine taken substantially along line 7—7 of Fig. 6; and Fig. 8 is a partial vertical section through the machine taken along the central axis thereof.

Figure 1:
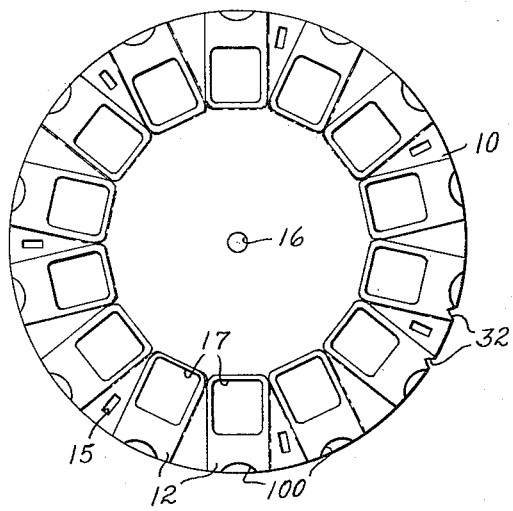
Fig. 1 is a view in elevation of the rear surface of a transparency holder formed in accordance with my invention.
Figure 3:
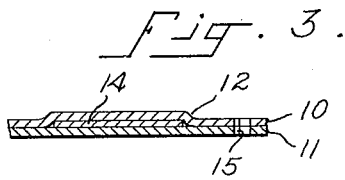
Fig. 3 is a section taken substantially along line 3—3 of Fig. 2.

In Figs. 1 to 4 inclusive, the holder of the present invention is illustrated in detail. The holder comprises a pair of coextensive blanks comprising a rear disc 10 and a front disc 11. The discs are bonded together throughout their extent except for radially disposed areas extending concentrically about the discs and defining pockets 12. The preferred construction comprises outwardly raised embossments on the rear disc 10, the inner surfaces of the embossments being spaced from and parallel to the plane of the inner surface of the front disc 11. The pockets 12 extend to the periphery of the disc and are generally arranged radially of the disc. Each pocket is of such a size as to receive a transparency 14 therein with the side and inner edges of the transparency snugly embraced by the side and inner edges of the raised embossments. The front disc 11 preferably remains perfectly smooth on each side, the inner surface thereof defining a plane for maintaining the transparencies in a common plane and the outer surface thereof defining a plane for registry with the mounting surface of a viewer such as disclosed in the aforesaid patent. The diameter of the disc is preferably such that the inner corners of the pockets touch each other or at least are very close together so as to reduce the size of the disc to the bare minimum commensurate with the size of transparency and the number of pockets. The holder is provided with a plurality of transverse openings 15 with which a feeding dog in the viewer may register, and a central aperture 16 with which a viewer spindle may register as shown in the aforesaid patent. In viewing transparencies the holder is positioned in a viewer having a spindle which passes through the central aperture 16 and the various diametrically disposed pairs of transparencies are successively caused to register with viewing eyepieces by successive engagement of a feeding dog with the apertures 15. Each of the blanks is formed with a viewing aperture 17 which is preferably rectangular in outline with three edges arranged parallel to and equidistant from the closed edges of the pockets 12. The apertures are preferably inwardly disposed from the edge of the disc so that portions of the pocket walls of considerable width extend beyond the aperture to provide a sturdy construction. The apertures are preferably symmetrically arranged within the pockets and spaced to correspond to the spacing of the viewing eyepieces of the viewer, and in the present disclosure are intended to be approximately 65 mm. apart corresponding to the average eye spacing.

Figure 5:
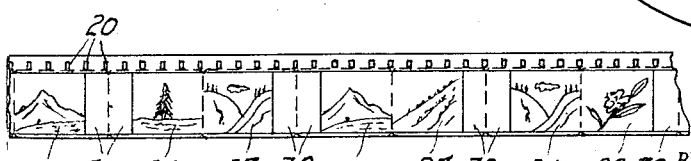
Fig. 5 is a plan view of a strip of film having exposures thereon as made by a stereoscopic camera, which exposures may be cut from the film strip and mounted in the holder of the present invention.

Fig. 5 illustrates a section of film having views thereon as taken by a stereoscopic camera so as to cause each exposure to impose a pair of spaced, inverted images of the object upon the film. The images may be spaced substantially 65 mm. apart corresponding to the spacing of the average eyes, in which case the film could be of any size such as 16 mm. film of the type having a single row of sprocket apertures 20 thereon. The film could also be of the 35 mm. width and the views, if of 16 mm. size, would be arranged in two parallel rows; or the views could be of the size normally occupying the full width of a 35 mm. film by having an arrangement of prisms in a camera having a pair of objective lenses spaced approximately 65 mm. apart. In the latter case the transparency holder would be large enough to receive 35 mm. transparencies and the viewing instrument would be arranged to reduce the spacing to the average 65 mm. by having a prism arrangement therein. The instant disclosure illustrates 16 mm. exposures mounted in a holder so arranged as to position the central points of the pairs of views substantially 65 mm. apart for straight viewing. Therefore, the maximum number of transparencies which may be mounted in a single holder is fourteen, comprising seven pairs of sterescopic views.

In Fig. 5 I have illustrated a short length of 16 mm. film having exposures thereon such as would be made by a certain type of sterescopic camera. This arrangement of exposures is such that evenly spaced exposures are arranged in an economical manner by advancing the film two frames at each exposure, thus having each pair of exposures separated by the right exposure of a preceding pair and the left exposure of a succeeding pair. The exposures 21 and 22 are separated by the left exposure 23 of a succeeding pair 23 and 24 and the right exposure 26 of a preceding pair. The exposures 23 and 24 are separated by exposure 22 and the left exposure 27 of a succeeding pair. The next succeeding pair is represented by the single left exposure 28. Each left exposure is separated from each adjacent right exposure by a blank space of sufficient width to provide two tabs 30 extending in the proper directions from the exposures. The dash lines on the figure represent the lines along which the film would be cut to provide transparencies including the exposures and tabs 30. The film is seen in Fig. 5 as it would appear when the emulsion side of the film is facing the observer.

Figure 2:
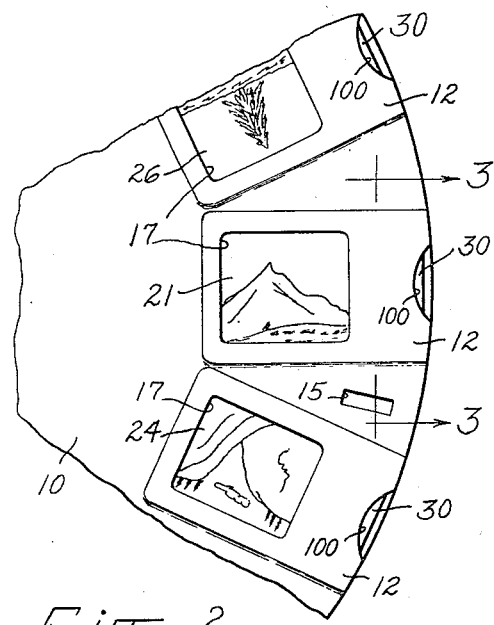
Fig. 2 is an enlarged detail view of a segment of Fig. 1.

Several of the corresponding views are shown in the enlarged partial view of Fig. 2 in the relationship they would assume when viewing the rear face of the holder.

Figure 4:
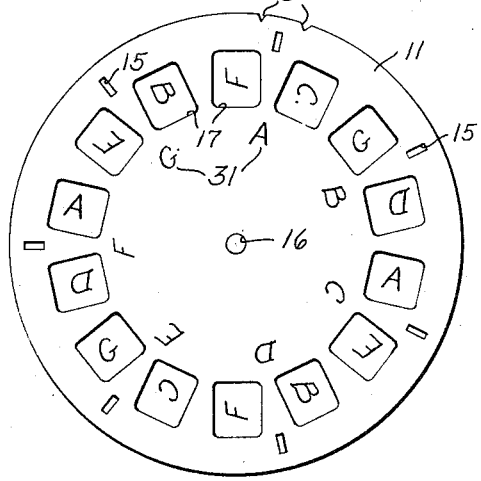
Fig. 4 is an elevation of the front surface of the holder.

As seen partially in Fig. 2 and fully in Fig. 4, the preferred holder illustrated comprises seven pairs of pockets, an uneven number. An even number of pockets could be provided in a holder, but this would be undesirable since legends 31 describing the pairs of views are preferably printed or written upon the face of the holder, each legend being placed on front face 11 above and midway between the pair of exposures it relates to. When a holder having legends so arranged is mounted in a viewer as disclosed in the above mentioned patent, the legends may be viewed through a central window when the corresponding transparencies are aligned with the viewing apertures in the viewer. If an even number of pairs of transparencies were mounted in the holder, legends could be placed only upon half of the holder. To bring diametrically opposed legends into registry with a single legend-viewing window would require inverted positioning of the same pair of transparencies in the viewing apertures, thus destroying the usefulness of half of the available area of the holder. A holder could have any odd number of pairs of transparencies, with legends equidistantly spaced between and above each pair, within the limits of available space. In Fig. 4 I have illustrated the specific holder having seven pairs of pockets wherein it will be seen that the legend "A," corresponding to the transparencies "A," is followed by the legend "B," corresponding to the transparencies "B," which is spaced therefrom the same angular distance as the angular distance between alternate apertures, hence the spacing of the dog-engaging apertures 15 is such as to cause alternate pairs of transparencies to appear successively at the viewing apertures. With this arrangement every other pair of transparencies is arranged upside down when viewing the holder in its entirety, but each pair will be brought to the apertures in its turn in proper position for viewing. Obviously other arrangements could be employed without departing from the invention. The holder is preferably provided with a pair of notches 32 in its edge in alignment with the legend "A," which serve to locate the first of a series of views in the viewer.

A preferred method and means for forming the holders is illustrated in Figs. 6 to 8 inclusive. In these figures there is shown a lower die 40 mounted upon a table 41, the die being heated by an internal resistance member 42 supplied with current through wires 43. The die is provided with a central guide pin 44 which enters the apertures 16 in the disc blanks to locate the edges of the discs at the edge of the die and to register the discs with each other. The pin 44 enters a coaxial recess 45 in an upper, movable die 46 heated by an internal resistance element 47 supplied with current through wires 48. The die 46 is mounted on the lower end of a piston rod 50 extending from a cylinder 60 mounted upon a plate 61 supported by posts 62. The cylinder may be supplied with fluid under pressure through a connecting tube 63 leading to any source of supply (not shown) and having control means associated therewith (not shown) whereby the piston rod 50 may be extended. The die may be retracted by spring means surrounding the piston rod (not shown).

The upper surface of lower die 40 is provided with a plurality of shallow, rectangular depressions 65 extending radially inward from the periphery of the die and corresponding in number and shape to the embossments 12 in the rear face 10 of the holder. A plurality of embossing tongues 66 are mounted about the periphery of the die 40 in such manner as to be radially extendible into and retractable from the areas defined by the depressions 65. Each of the tongues 66 is mounted upon a plunger 67 guided in journals 68 and 69 extending upward from the top of the table 41. Each plunger is movable radially inward by the upper arm of a bell crank 70 mounted in a bracket 71 extending beneath the table 41, the table having a slot 72 therethrough and the plunger having a slot 73 into which the upper end of the arm extends. The arm therefore not only acts as an actuator for the plunger but serves to prevent rotation of the plunger and thus keeps the tongue 66 lying horizontally. The outer end of each plunger 67 is provided with a screw extension 75 upon which is mounted an adjustable limiting nut 76 which strikes the outer surface of the journal 69 to limit inward movement of the tongue. A crosshead bar 78 is threaded for reception of screw 75, the bar being backed by the head 77 of the screw. A pair of springs 79 extend from the ends of the bar 78 inwardly parallel to the plunger, the inner ends of the spring being attached to vertical posts 80 fixed to the top of table 41. The nut 76 may be adjusted to limit inward movement of plunger 67 when the springs 79 are permitted to force the plunger inwardly.

The bell crank 70 has its inner arm extending into a groove in the periphery of a disc 85 mounted upon the end of a piston 86 extending upward axially of the machine from a cylinder 87 mounted upon a support 88 carried by posts 89 depending from the table 41. A tube 90 leads from the cylinder to a source of supply of fluid under pressure (not shown) and any suitable valving arrangement may be associated therewith (not shown) for extending the piston rod 86. When fluid is permitted to escape from the cylinder 87 the springs 79 cause retraction of the piston rod 86.

The tongues 66 are formed of thin, resilient sheet metal such as Phosphor bronze and are set to flex upwardly when lying in their normal positions so that the inner ends of the tongue normally lie at a level above the upper surface of a disc 10 which may be positioned on the lower die 40. Each of the tongues is preferably provided with a checkerboard of small apertures 95 extending transversely therethrough. The tongues 66 are substantially equal in thickness to, or at most just slightly thicker than, the film thickness so that when a tongue is interposed between a pair of disc blanks positioned on the lower die 40 and the upper die is depressed the tongue will form the embossment in the lower blank, the dimensions being such as to form pockets of a size normally to embrace the edges and front and rear faces of the transparencies cut from the length of film. The die 40 is provided with one or more lugs 96 which register with the apertures 15 and locate the apertures 17 accurately in line with each other, the lugs entering recesses (not shown) in die 46.

The blanks from which the holders are formed preferably comprise fibrous material such as thin cardboard impregnated with a thermoplastic or (preferably) thermo-setting substance such as any of the phenolic resins so that when heated by the die the material will be caused permanently to assume the shape impressed thereon by the die 40 operating in conjunction with the tongues 66. The blanks may be formed of thin, malleable metal such as sheet copper or thin sheet steel of the proper characteristics to assume a permanent set when deformed by the die operating in conjunction with the tongues. One or both of the adjacent surfaces of the blanks may be provided with a coating of a thermosetting or thermoplastic adhesive, or a thin sheet of adhesive may be imposed between the blanks when they are positioned upon the die, so that under the influence of heat from the dies the major portions of the blanks are permanently bonded to each other. The tongues 66 are preferably withdrawn before die 46 and apertures 95 in the tongues 66 serve to scrape off and collect any adhesive which might otherwise block the pockets formed by the tongues. After a certain number of operations the tongues may be cleaned as by a solvent for the adhesive. In the event that metallic blanks are utilized for forming the holder a suitable solder may be placed upon either or both of the adjacent surfaces of the blanks and caused to be melted by the heat of the dies. The holder may be formed of suitable plastic material such as vinyl acetate which self-bonds under heat and pressure. The preferred sequence of operations is to place disc blank 10 on die 40, move the tongues 66 inwardly thereover, place disc blank 11 on top of the tongues, and then depress die 46.

The present invention may be utilized by any amateur having a stereoscopic camera, a supply of holders, and a die for punching or otherwise severing transparencies with tabs thereon from the developed strip of film. The transparencies may be slid into the pockets in proper relation to each other and the appropriate legends placed upon the surface of the holder, whereupon the holder is ready for use in a viewing mechanism. Various series of transparencies may be substituted if desired by removing one series of transparencies from a holder and placing another series therein. For this purpose at least one of the discs is provided with an edge notch 100 within the limits of each of the pockets, the notch being of sufficient depth to leave a portion of the tab 30 exposed in order that the tab may be grasped by a pair of tweezers or the like.

Having illustrated and described a preferred embodiment of my invention, it should be apparent to those skilled in the art that the invention permits of modification in arrangement and detail. I claim as my invention all such modifications as come within the true spirit and scope of the appended claims.

I claim:

1. A holder for stereoscopic transparencies comprising a disc having a concentric ring of viewing apertures therethrough arranged in diametrically opposed pairs, said disc having a plurality of transparency holding pockets lying in the plane of the disc and opening toward the periphery thereof, each of said apertures being located within the confines of one of said pockets whereby stereoscopic pairs of transparencies may be removably mounted in the disc in proper relation to each other for stereoscopic viewing, each of said pockets being rectangular and of such dimensions as snugly to receive and frictionally to retain a standard transparency.

2. A holder for stereoscopic transparencies comprising a disc having a concentric ring of viewing apertures therethrough arranged in seven diametrically opposed pairs, said disc having a plurality of transparency holding pockets extending radially inward from the periphery of the disc, each of said apertures being located within the confines of one of said pockets whereby stereoscopic pairs of transparencies may be removably mounted in the disc in proper relation to each other for stereoscopic viewing, and each of said pockets being rectangular and of such dimensions as to receive snugly and frictionally retain a standard transparency.

3. A holder for stereoscopic transparencies comprising a disc having a plurality of pockets arranged in diametrically opposed pairs, said pockets extending radially inward from the periphery of the disc, each pocket having its side edges aligned with the side edges of an opposed pocket and said pockets being of the same depth whereby stereoscopic pairs of transparencies may be maintained in stereoscopic registry, at least one wall of each of said pockets being recessed inwardly from the periphery of the disc in order that the edge of an inserted transparency may be exposed.

4. A holder for stereoscopic transparencies comprising a pair of substantially coextensive blanks united face to face to form a single disc, at least one of said blanks having embossments defining rectangular pockets opening toward the periphery of the disc.

5. A holder for stereoscopic transparencies comprising a pair of substantially coextensive blanks united face to face to form a single disc, at least one of said blanks having embossments arranged in diametrically opposed pairs and defining, together with the adjacent portions of the other blank, radially extending rectangular pockets opening toward the periphery of the disc, said embossments having accurately defined parallel side and inner edges whereby rectangular stereoscopic transparencies may be received within said pockets in stereoscopic registry.

KARL F. KURZ.

REFERENCES CITED

The following references are of record in the file of this patent:

UNITED STATES PATENTS

| Number | Name | Date |
|---|---|---|
| 861,418 | Wright | July 30, 1907 |
| 1,096,873 | Victor | May 19, 1914 |
| 1,634,713 | Gaines | July 5, 1927 |
| 1,901,245 | Jones | Mar. 14, 1933 |
| 2,149,507 | Camfield | Mar. 7, 1939 |
| 2,189,285 | Gruber | Feb. 6, 1940 |
| 2,266,846 | Buff | Dec. 23, 1941 |
| 2,373,392 | Griswold | Apr. 10, 1945 |
| 2,446,038 | Amigo | July 27, 1948 |